United States Patent

Meyer et al.

[15] 3,671,839

[45] June 20, 1972

[54] METHOD AND APPARATUS FOR AUTOMATIC PROGRAMMED CONTROL OF A MACHINE TOOL

[72] Inventors: Jurgen Meyer; Gerhard Sautter, both of Erlangen, Germany

[73] Assignee: Siemens Aktiengesellschaft, Berlin and Munich, Germany

[22] Filed: Sept. 23, 1970

[21] Appl. No.: 74,636

[30] Foreign Application Priority Data

Sept. 23, 1969  Germany..................P 18 03 742.8

[52] U.S. Cl..............................318/571, 318/603, 318/39
[51] Int. Cl..........................................G05b 19/24
[58] Field of Search..................318/39, 603, 571

[56] References Cited

UNITED STATES PATENTS

| 3,545,310 | 12/1970 | Porath et al. | 318/39 X |
| 3,418,549 | 12/1968 | Emerson et al. | 318/571 X |
| 3,573,588 | 4/1971 | Geyer et al. | 318/571 |

*Primary Examiner*—Benjamin Dobeck
*Attorney*—Curt M. Avery, Arthur E. Wilfond, Herbert L. Lerner and Daniel J. Tick

[57] ABSTRACT

In a system for programmed control of a machine tool for removal of material from a workpiece, the material removing rate $P_z$ is derived from the speed and torque of the tool or workpiece and the feed velocity $V_z$ is controlled in one direction of movement of the tool or workpiece in dependence upon the material removing rate. A feed velocity $V_x$ is controlled in a direction perpendicular to the one direction in dependence upon the feed velocity $V_z$ and the derivative $dP_z/dt$.

5 Claims, 11 Drawing Figures

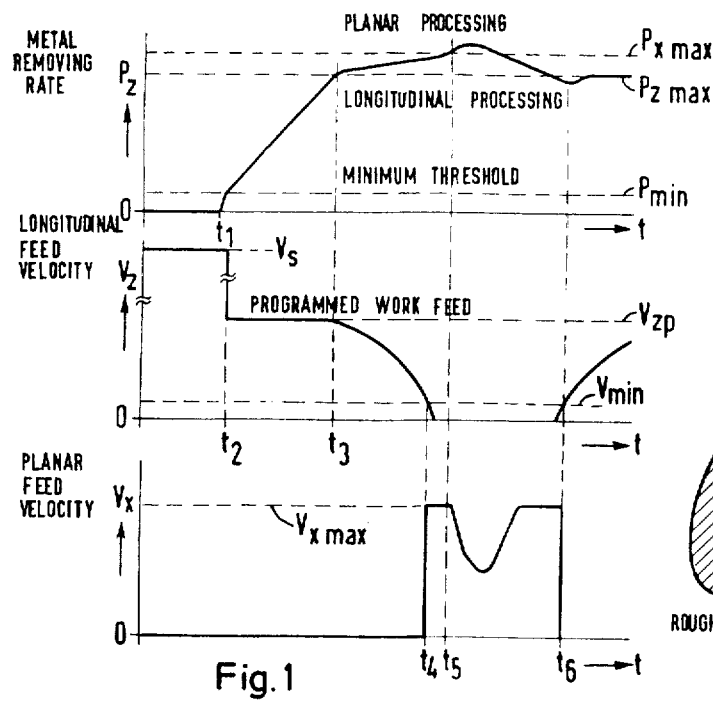
Fig. 1
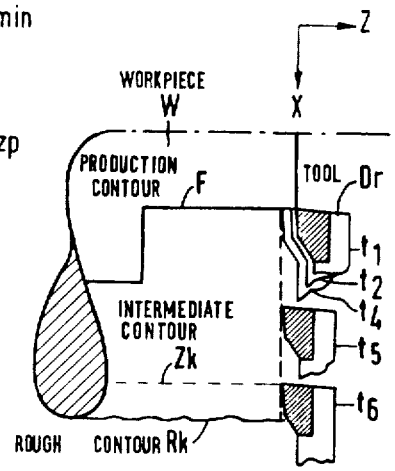
Fig. 2
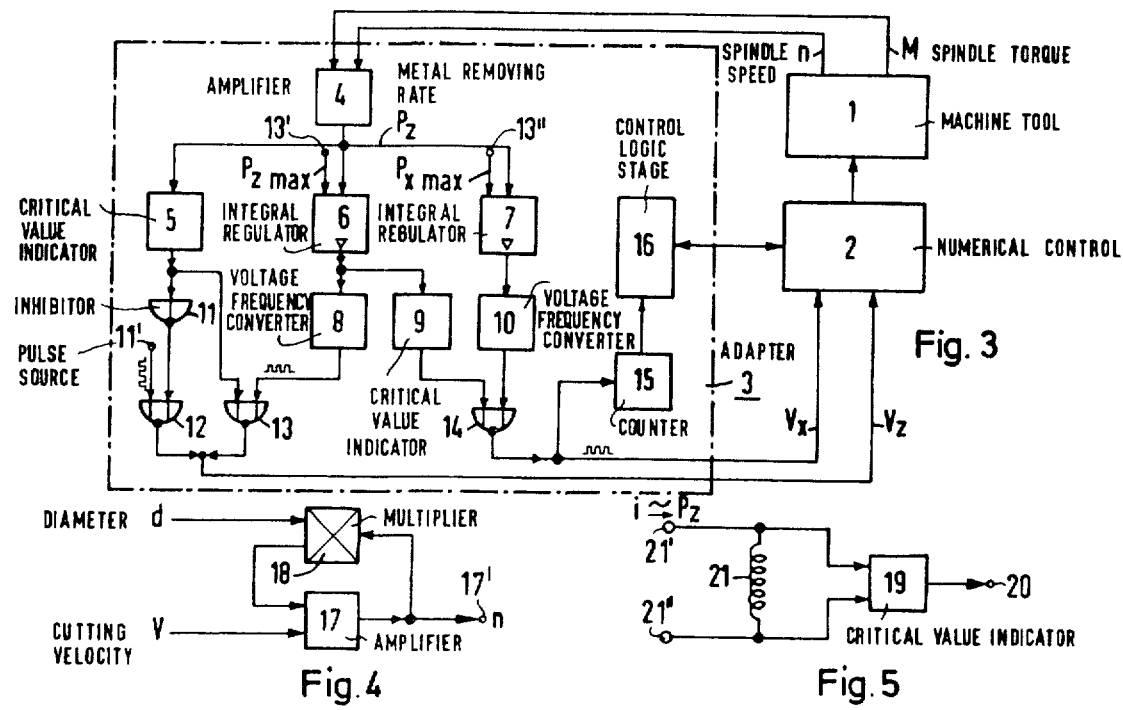
Fig. 3
Fig. 4
Fig. 5

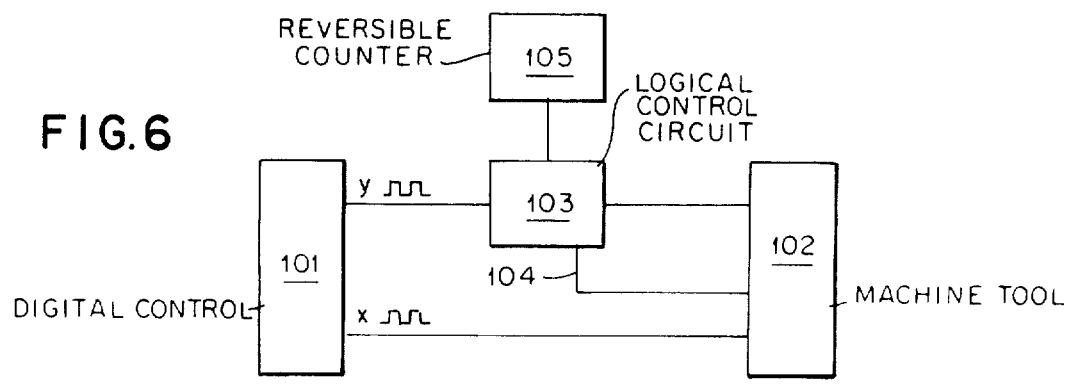
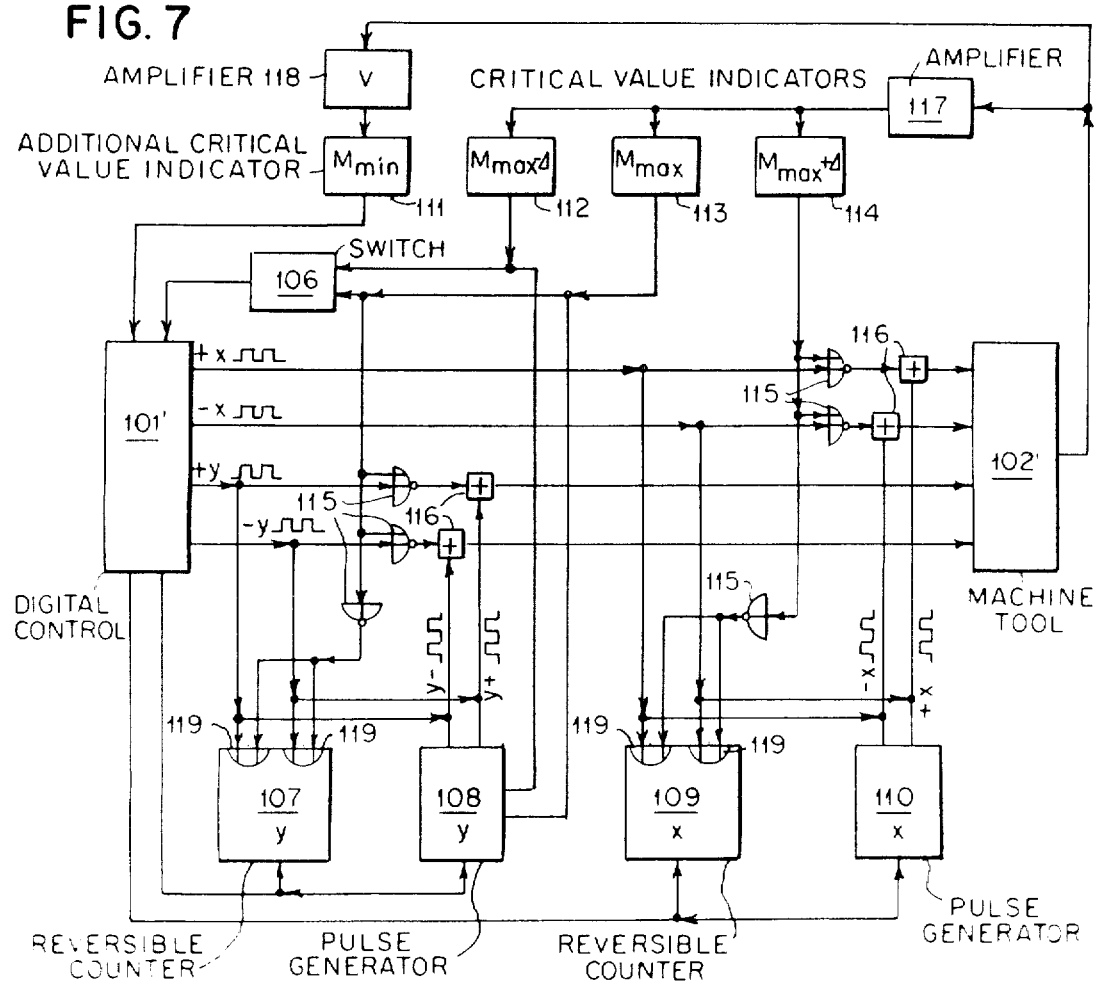

METHOD AND APPARATUS FOR AUTOMATIC PROGRAMMED CONTROL OF A MACHINE TOOL

DESCRIPTION OF THE INVENTION

The invention relates to a method and apparatus for automatic programmed control of a machine tool. More particularly, the invention relates to a method and apparatus for automatic programmed control of a turning machine tool or lathe for the removal of material from a workpiece.

The method and apparatus of the invention are an improvement over the method and apparatus of pending U.S. Pat. application Ser. No. 866,507, filed Oct. 15, 1969, for "Method and Apparatus for Automatic Forward Feed Programmed Control of a Machine Tool," and now abandoned, assigned to the same assignee. In the aforedescribed copending patent application, a method for the adaptive regulation or control of a machine tool is disclosed, wherein the tool is rapidly fed until it comes into contact with a workpiece. The tool is work fed only after a magnitude depending upon the forming power exceeds a lower threshold level. The work feeding and movement of the tool are reduced in the direction of reduced feed-in for a period of time until the magnitude depending upon the forming power exceeds an upper threshold level. The processing operation is repeated until the actual contour of the workpiece coincides with a programmed contour. The programmed contour may be recorded or stored on any suitable record medium such as, for example, a perforated strip or tape.

In the method and apparatus of the aforedescribed copending patent application, the torque of the tool or workpiece, or the spindle driving the tool or workpiece, is utilized as a controlled variable for removing material or metal from the workpiece or for the forming power of the tool. The magnitude depending upon the forming power may be a torque which is absorbed by the machine tool, workpiece, or the like, or it may be the force which is exerted upon the machine tool.

The principal object of the invention is to provide new and improved method and apparatus for the automatic programmed control of a machine tool.

An object of the invention is to provide a method for the automatic programmed control of a machine tool with efficiency, effectiveness and reliability.

An object of the invention is to provide apparatus for the automatic programmed control of a machine tool with efficiency, effectiveness and reliability.

An object of the invention is to provide a controlled variable for the material removing rate which may fully balance the tool, even at an alternating or variable speed.

An object of the invention is to provide a method for providing a controlled variable for the material removing rate which may fully balance the tool, even at a variable speed, and which utilizes such controlled variable for controlling the work feeding of the tool.

In accordance with the invention, a method for automatic programmed control of a machine tool for removal of material from a workpiece comprises the steps of rapidly feeding the tool until it comes into contact with a workpiece, work feeding the tool up to a maximum to the programmed contour after a magnitude depending upon the forming power and the material removing rate exceeds a lower threshold level, reducing the work feeding and movement of the tool in the direction of reduced feed-in for a period of time until the magnitude depending upon the forming power exceeds an upper threshold level, work feeding the tool repeatedly until the actual contour of the workpiece coincides with a programmed contour, deriving the material removing rate $P_z$ from the speed and torque of the tool or workpiece, controlling the feed velocity $V_s$ in one direction of movement of the tool or workpiece in dependence upon the material removing rate, deriving the first derivative $dP_z/dt$ of the derived material removing rate $P_z$, and controlling a feed velocity $V_x$ in a direction perpendicular to the one direction in dependence upon the feed velocity $V_s$ and the derivative $dP_z/dt$.

The work feed is released in the direction of the feed velocity $V_x$ when the feed velocity $V_s$ decreases to less than a specific magnitude $V_{min}$.

The feed velocity $V_x$ is controlled in dependence upon the material removing rate as long as the material removing rate exceeds a specific magnitude $P_{z\,max}$.

The machine tool is a turning machine and the velocity of the tool or workpiece may be varied in dependence upon the feed velocity $V_s$.

A decrease in feed velocity in dependence upon the material removing rate may be directly effected and an increase in feed velocity in dependence upon the material removing rate may be effected with delay.

In accordance with the invention, apparatus for automatic programmed control of a machine tool for removal of material from a workpiece comprises feeding means for rapidly feeding the machine tool until it comes into contact with a workpiece. Work feeding means work feeds the tool up to a maximum to the programmed contour after a magnitude depending upon the forming power and the material removing rate exceeds a lower threshold level and reduces the work feeding and movement of the tool in the direction of reduced feed-in for a period of time until the magnitude depending upon the forming power exceeds an upper threshold level. The work feeding means operates repeatedly until the actual contour of the workpiece coincides with a programmed contour. The work feeding means has inputs connected to the tool or workpiece for supplying signals representing the speed and torque of the tool or workpiece. The work feeding means has a multiplier connected to the inputs for providing a signal $P_z$ corresponding to the material removing rate, and integral regulating means, reference magnitude means, voltage-frequency converting means, critical value indicating means and gate means for producing first control signal for controlling the feed velocity $V_s$ in one direction of movement of the tool or workpiece in dependence upon the material removing rate and for producing a second control signal for controlling a feed velocity $V_x$ in a direction perpendicular to the one direction in dependence upon the feed velocity $V_s$ and the first derivative $dP_z/dt$ of the material removing rate $P_z$. Outputs connected from the gate means to the tool or workpiece supply the first and second control signals to the tool or workpiece.

In order that the invention may be readily carried into effect, it will now be described with reference to the accompanying drawings, wherein:

FIG. 1 is a graphical presentation of the material removing rate, the longitudinal feed of a tool and the planar feed of the tool;

FIG. 2 is a schematic diagram, partly in section, illustrating the position of the tool during specific instances of time shown in FIG. 1;

FIG. 3 is a schematic circuit block diagram of an embodiment of apparatus of the invention for automatic programmed control of a machine tool;

FIG. 4 is a schematic circuit block diagram of apparatus for maintaining the cutting speed in a lathe with increasing diameter;

FIG. 5 is a schematic circuit block diagram of apparatus for controlling the planar feed velocity of a machine tool in dependence upon the first derivative of the material removing rate;

Figure 8A:
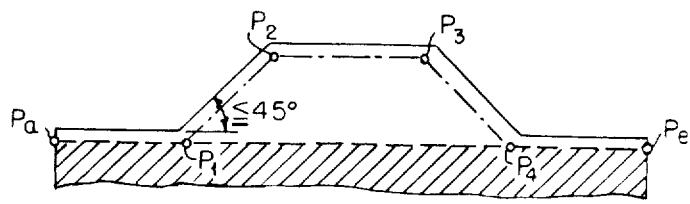

FIG. 6 is a schematic block diagram of the circuit arrangement of copending U.S. Pat. application Ser. No. 866,507, and now abandoned, for providing variable workpiece contours in accordance with the method illustrated in FIGS. 8a and 8b;

FIG. 7 is a schematic block diagram, in more detail, of the circuit arrangement of copending U.S. Pat. application Ser. No. 866,507, and now abandoned, for providing variable workpiece contours in accordance with the method illustrated in FIGS. 9a and 9b; and FIGS. 8a, 8b, 9a and 9b illustrate various methods of the copending patent application Ser. No. 866,507, and now abandoned, for providing variable workpiece contours.

In the figures, the same components are represented by the same reference numerals.

The adaptation or control is derived, as a measured quantity, from the forming power or material removing rate $P_z$. The measured quantity is calculated or derived from the torque M and the speed n of a machine tool or lathe Dr (FIG. 2), the workpiece W (FIG. 2) or the spindle driving said tool or workpiece. The machine tool Dr may comprise, as illustrated, a turning machine or lathe such as, for example, a steel lathe. The tool Dr is rapidly fed, at a high velocity or speed $V_s$, as shown in the center curve of FIG. 1, until it comes into contact with the workpiece W.

FIG. 1 comprises an upper curve, a center curve and a lower curve. In the upper curve, the abscissa represents the time $t$ and the ordinate represents the material or metal removing rate $P_z$. In the center curve, the abscissa represents the time t and the ordinate represents the longitudinal feed velocity $V_z$. In the lower curve, the abscissa represents the time $t$ and the ordinate represents the planar feed velocity $V_x$.

As shown in FIGS. 1 and 2, the steel lathe Dr is engaged with the workpiece W at a the instant $t_1$. The velocity may only be changed from the initial high velocity to the programmed work feed velocity $V_{zp}$ (center curve of FIG. 1) when a specific minimum threshold level $P_{min}$ of the material removing rate $P_z$ is exceeded (upper curve of FIG. 1). This occurs at a time instant $t_2$. The lathe Dr then penetrates into the workpiece W until a time instant $t_3$. At the time instant $t_3$, the efficiency of the metal or material removing rate $P_z$ is exceeded for longitudinal processing $P_{z\,max}$ (upper curve of FIG. 1).

After the time instant $t_3$, the longitudinal feed velocity $V_z$ is reduced or decreased under control, as shown in the center curve of FIG. 1. When the longitudinal feed velocity $V_z$ decreases to a magnitude less than a specific minimum magnitude $V_{min}$, as occurs as a time instant $t_4$, as shown in the center curve of FIG. 1, an additional control of the planar feed velocity $V_x$ is instituted. Initially, the control of the planar feed velocity $V_x$ only reduces or decreases the cutting depth by withdrawing the lathe Dr at a constant planar feed velocity $V_{x\,max}$, as shown in the lower curve of FIG. 1.

The planar feed velocity $V_x$, as illustrated in the lower curve of FIG. 1, is additionally reduced or decreased under control only if the initial control of said planar feed velocity fails to decrease or reduce the material removing rate $P_z$, but results in said material removing rate exceeding the planar processing $P_{x\,max}$, as shown in the upper curve of FIG. 1. This is necessary, for example, when a rotating part is processed at a constant velocity of the spindle, since the material removing rate also increases with an increase in the diameter of the workpiece. The control of the planar feed velocity prevents the maximum material removing rate $P_{x\,max}$ in the planar direction from being exceeded during the planar rotation, or during the reduction of the cutting depth.

When the lathe Dr reaches the outer diameter of the workpiece W, the effective cutting depth is again decreased or reduced, so that the material or metal removing rate $P_z$ is also decreased or reduced. This occurs at a time instant shortly before a time instant $t_5$. At the time instant $t_5$, the work feed exceeds its lower threshold level $V_{min}$, as shown in the center curve of FIG. 1, and further decrease or reduction of the cutting depth due to the planar feed velocity $V_x$ is again prevented.

Due to the aforedescribed method of precessing, the maximum work feed is limited by the programmed work feed velocity $V_{zp}$ (center curve of FIG. 1). The cutting depth and the feed velocity are automatically determined at an optimum.

During the processing of the workpiece W by the machine tool Dr, as illustrated in FIG. 2, said workpiece has a rough contour Rk, an intermediate contour Zk and a production contour F.

FIG. 3 illustrates apparatus for providing the aforedescribed processing illustrated in FIG. 1. In FIG. 3, a machine tool 1 produces data which is supplied to an adapter 3. The data supplied by the machine tool 1 comprises, for example, the torque M and the speed n of the machine tool 1, the workpiece W (not shown in FIG. 3), or the spindle which drives said machine tool or workpiece. The torque M and the speed n are utilized as controlled variable for the material or metal removing rate $P_z$. The adapter 3 provides appropriate control signals at its outputs and such control signals are supplied to a numerical control 2 of the machine tool 1.

The adapter 3 comprises multiplier 4. The torque and speed data M and n, respectively, is supplied from the machine tool 1 to the inputs of the multiplier 4. The multiplier 4 produces from the torque and speed data M and n, respectively, the material or metal removing rate $P_z$. The actual magnitude of the material removing rate $P_z$ is based upon the additional control or regulation of the work feed. As long as the material removing rate $P_z$ is less than the minimum threshold level $P_{min}$ (upper curve of FIG. 1), a critical value indicator 5 cannot respond.

The input of the critical value indicator 5 is connected, in common with an input of an integral regulator 6 and an input of an integral regulator 7, to the output of the multiplier 4. Since the critical value indicator 5 cannot respond, a gate 12, having a first input which is coupled to the output of said critical value indicator via an inhibitor 11, is in its conductive condition, so that a plurality of pulses corresponding to the high velocity $V_s$ is supplied from a pulse source 11' to the numerical control 2. The pulse source 11' is connected to the second input of the AND gate 12. The supply of the pulses from the pulse source 11' to the numerical control 2 results in a corresponding work feed in the longitudinal direction Z.

When the material removing rate $P_z$ exceeds the predetermined minimum threshold level $P_{min}$, the critical value indicator 5 responds by producing an output signal. The inhibitor 11 converts the output signal of the critical value indicator 5 to no signal, so that the gate 12 is switched to its non-conductive condition. The output of the critical value indicator 5 is connected to a first input of an AND gate 13. Thus the output signal produced by the critical value indicator 5 switches the AND gate 13 to its conductive condition at a time instant $t_2$.

A longitudinal reference or datum material removing rate indication or longitudinal processing datum magnitude $P_{z\,max}$ is supplied to the other input of the integral regulator 6 via an input terminal 13'. A planar reference or datum material removing rate indication or planar processing datum magnitude $P_{x\,max}$ is supplied to the other input of the integral regulator 7 via an input terminal 13''.

The output of the integral regulator 6 is connected in common to the input of a voltage-frequency converter 8 and the input of a critical value indicator 9. The output of the voltage-frequency converter 8 is connected to the second input of the AND gate 13. The output of the critical value indicator 9 is connected to the first input of an AND gate 14. The output of the integral regulator 7 is connected to the input of a voltage-frequency converter 10. The output of said voltage-frequency converter is connected to the second input of the AND gate 14.

Since there is a considerable difference between the longitudinal datum or reference value or magnitude $P_{z\,max}$ and the material removing rate $P_z$ (upper curve of FIG. 1), the integral regulator 6 produces up to a maximum output voltage. When the integral regulator 6 produces an output voltage, said output voltage provides, via the voltage-frequency converter 8, a pulse sequence proportional to the programmed work feed $V_{zp}$, for controlling the longitudinal feed velocity $V_z$.

If the longitudinal reference or datum value $P_{z\,max}$ is exceeded at the time instant $t_3$(upper curve of FIG. 1), the longitudinal feed signal provided by the integral regulator 6 is correspondingly reduced. When the output signal of the integral regulator 6 decreases to less than a predetermined specific magnitude $V_{min}$, at a time instant $t_4$, as indicated by the critical value indicator 9, the gate 14 is switched to its conductive condition.

When the gate 14 is switched to its conductive condition, the integral regulator 7 for the planar feed velocity $V_x$ provides, via the voltage-frequency converter 10, a pulse sequence for altering the cutting depth in accordance with the difference between the planar datum or reference value or magnitude $P_{z\,max}$ and the metal removing rate $P_z$ (upper curve of FIG. 1). If an adequate reduction of the material removing rate $P_z$ is not attainable due to such variation of the cutting depth at a constant feed velocity, there will also be a reduction in the output signal of the integral regulator 7, at the time instant $t_5$. The reduction in the output signal of the integral regulator 7 results in a decrease or reduction in the planar feed velocity $V_x$. At the time instant $t_6$, the longitudinal feed velocity $V_z$ again exceeds the limit magnitude $V_{min}$ (center curve of FIG. 1). This decreases the planar feed velocity $V_x$ to zero (lower curve of FIG. 1).

The pulse sequences provided by the voltage-frequency converters 8 and 10 may be so evaluated, for example, for determining the feed velocity, that they may be utilized for timing an interpolator included in the numerical control 2 or for driving stepping motors.

The provision of the planar feed velocity $V_x$ during a material removing rate $P_z$ which is too high is a deviation from the specifically programmed contour. Such deviation must thus be registered in a counter 15 having an input connected to the output of the AND gate 14. The output of the counter 15 is connected to the input of a control logic stage 16 which is connected to the numerical control 2 of the machine tool 1. Since the deviation registered in the counter 15 must again be reduced to zero, the control logic stage 16 acts accordingly on the numerical control 2. The numerical control 2 may thus control the individual processing cycles in accordance with the position or count condition of the counter 15.

As hereinbefore described, the cutting depth is varied during the adaptation in dependence upon the measured material or metal removing rate $P_z$. If the speed or velocity of the spindle which drives the tool Dr or workpiece W is maintained at a constant magnitude, this results in a variation of the cutting velocity. This is not desirable from the standpoint of the material removing technique, since in such case the material removing ratios are changed in less beneficial magnitudes. It is thus expedient to combine a control or regulating device with the adapter for maintaining the cutting velocity constant in dependence upon the position of the workpiece or turning diameter by control of the speed of the spindle.

FIG. 4 illustrates an embodiment of a regulating or control device for maintaining the cutting velocity constant in dependence upon the workpiece position or the turning diameter by controlling the spindle speed. The cutting velocity V is represented by a signal applied to an input of an amplifier 17. The turning or rotating diameter d is represented by a signal supplied to an input of a multiplier 18. The output of the multiplier 18 is connected to the other input of the amplifier 17. The output of the amplifier 17 is supplied to an output terminal 17' and is fed back to the input of the multiplier 18. The output signal provided at the output terminal 17' corresponds to the desired spindle velocity or speed n.

The cutting velocity V may be adjusted by any suitable means such as, for example, a potentiometer (not shown in the FIGS.) The cutting velocity V may also be supplied or fed in for each program. The signal representing the rotating or turning diameter d may be derived either at the carriage or at the spindle of the feed drive, or may be derived from an inert actual value counter in the control system. The output signal n is proportional to the work feed divided by the rotating diameter.

It may be preferable to control the planar feed velocity $V_x$ not only in dependence upon the magnitude of the material removing rate or the magnitude of the work feed, but in dependence upon a signal proportional to the slope or rate of change of the inclination of the material removing rate. The slope of the material removing rate is the first derivative or differential quotient $dP_z/dt$ of the material removing rate $P_z$. This is due to the fact that the decrease of the planar feed velocity $V_x$ to zero is relatively critical during the work feeding process, since the material removing rate increases very sharply in such instance.

The aforedescribed method of operation may be provided by the circuit of FIG. 5, by utilizing a current $i$ as a measuring signal proportional to the measured material removing rate $P_z$. The current $i$ is applied to an inductance 21 via input terminals 21' and 21''. The inductance 21 is connected across the inputs of a critical value indicator 19. Since the current $i$ is applied to the inductance 21, the voltage increase at said inductance is proportional to the variation of the current with regard to time, and is thus proportional to the variation of the measured material removing rate $P_z$ with regard to time. When the variation or change in the measured material removing rate exceeds a predetermined magnitude, the critical value indicator 19 responds and switches the AND gate 14 to its conductive condition, via its output terminal 20, which is connected to the first input of said AND gate (FIG. 3).

During the processing of highly irregular rough workpieces in a lathe or the like, various points must be taken into consideration. The most critical point is a lack of roundness or circular configuration which may occur at only one point of the diameter. The trajectory velocity must be adjusted to such a condition so that with an increased torque, the velocity is rapidly decreased, but during the instant of decrease a time constant is active. The time constant has a magnitude dependent upon the instantaneous spindle speed or velocity.

In the same manner, the reversal from rapid to normal work feed must be effected in a specific delay period. The requirements for the time constant and for the specific delay period may be attained by appropriate wiring of the work feed regulators (FIG. 3) and by connection of a delay member in the critical value indicator 5.

Aside from radial irregularities, a rough material workpiece may also have axial irregularities. Axial irregularities are primarily indicated by irregularities occurring on the planar surface of the rough workpiece which is contacted or engaged during the first cut or removal of material. In such instance, and in addition to the aforedescribed features, either the high velocity must be so strongly decreased or reduced that an assumed noncircularity may no longer be detrimental during starting operations, or an appropriate sensor must be additionally provided for scanning the irregularities prior to the penetration of the tool.

When the irregularities are of very large dimensions, it seems preferable to design the adapter or control system in a manner whereby a withdrawal of the tool in the longitudinal direction Z (FIG. 2) is also feasible in the planar direction X (FIG. 2), analogously to the variation in cutting depth.

In FIG. 6, a digital control 101 produces control pulses $x$ and $y$ and supplies such control pulses to the $x$ and $y$ drives of machine tool 102. The $x$ control pulses are supplied to the $x$ drive or stepping motor, for example, and the $y$ control pulses are supplied to the $y$ drive or stepping motor, for example. A logical control circuit 103 is connected into the $y$ control circuit which transfers the $y$ control pulses from the digital control 101 to the machine tool 102. An input of the logical control circuit 103 is connected to the digital control 101, an output of said logical control is connected to machine tool drives and an output of said logical control circuit is connected to the input of a reversible counter 105. The logical control circuit 103 has a second input connected to the machine tool 102 via a lead 104.

Figure 8B:
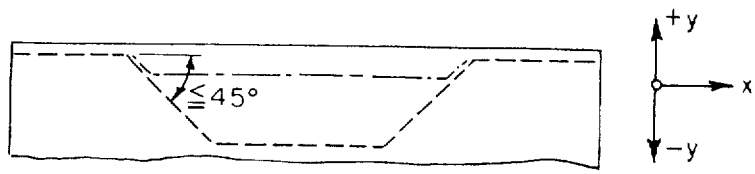

The logical control circuit 103 provides an increase or decrease in the cutting depth of the machine tool 102 in accordance with the torque applied thereto, as hereinbefore described. The operation of the circuit arrangement or apparatus of FIG. 6 is described with reference to FIG. 8a. The contour $P_a$, $P_1$, $P_4$ and $P_e$ is programmed as a unit. This may be in perforated strip, for example. Only $x$ control pulses are provided. No $y$ pulses are provided. The torque M applied to the cutting tool while it moves along the path $P_a$ to $P_1$ is less than the upper threshold level $M_{max}$ of the torque. There is thus no reason for reducing the cutting depth, that is, to move the cutting tool in the direction $+y$ (FIG. 8b).

If the reverse were true, and the torque M were less than the lower threshold level $M_{max}-\Delta$ of the torque, no increase would be provided in the cutting depth, since the contour produced by the cutting tool would then coincide with the programmed contour. The contour is monitored by the zero position of the reversible counter 105.

When the tool reaches the point $P_1$, the torque M applied thereto exceeds the upper threshold level $M_{max}$. This signals the logical control circuit 103 to supply $+y$ control pulses to the machine tool to reduce the cutting depth. The $+y$ control pulses, which comprise a y deviation from the programmed contour, are simultaneously supplied to the reversible counter 105. If the forward feed speeds in the x and y directions are equal to each other, the cutting tool moves at an angle of 45° to the point $P_2$, as shown by the broken dot and dash line.

At the point $P_2$ the cutting tool begins to move freely and the upper threshold level $M_{max}$ is thereby fallen short of. As a result, the reduction in the cutting depth $+y$ is blocked or halted and the tool moves along the contour path $P_2$ to $P_3$. The tool again moves freely and the torque decreases to a magnitude which is less than the lower threshold level $M_{max}-\Delta$. This indicates that the cutting depth will increase. The increase in the cutting depth is permissible, however, since the programmed y contour deviates from the actual contour, as indicated by the count condition of the reversible counter 105.

The logical control circuit 103 (FIG. 6) then supplies $-y$ pulses to the machine tool 102 and to the reversible counter 105. The tool 102 (FIG. 6) then moves from the point $P_3$ to the point $P_4$ along the contour path $P_3$ to $P_4$. At the point $P_4$, the count condition of the reversible counter 105 is zero. This indicates that the cutting depth y must not be further increased. The logical control circuit 103 thus does not provide any more pulses. The machine tool then moves along the contour path $P_4$ to $P_e$ from the point $P_4$ to the point $P_e$. The cycle is then repeated, from the point $P_a$ to the point $P_e$, as described, until the machine tool moves over the entire contour at rapid speed. When the machine tool moves over the entire contour path at rapid speed, the actual contour coincides with the programmed contour, and such contour is indicated by the linear broken line $P_a$ $P_1$ $P_4$ $P_e$. The method described for providing the broken contour of FIG. 8a may be utilized to provide the depressions, channel, groove, and the like, of FIG. 8b. In FIG. 8b, the dot and dash line indicates the contour path of the machine tool in one cycle of operation. The desired contour is indicated by the broken line.

Figure 9A:
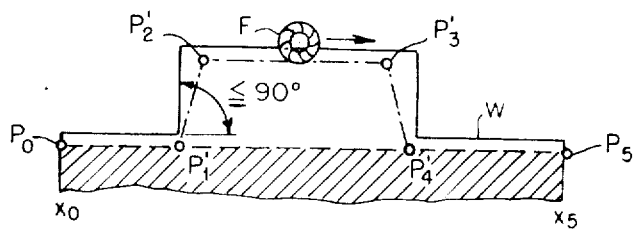

FIG. 7 illustrates apparatus or a circuit arrangement for performing the method illustrated in FIG. 9a. In FIG. 7, as in FIG. 6, a digital control 101' produces $+x$, $-x$, $+y$ and $-y$ control pulses and supplies said pulses to a machine tool 102'. A plurality of critical value indicators is provided. The critical value indicator 112 has a variable response sensitivity to the lower threshold level $M_{max}-\Delta$. The critical indicator 113 has a variable response sensitivity to the upper threshold level $M_{max}$. The critical indicator 114 has a variable response sensitivity to a threshold level $M_{max}+\Delta$ above the upper threshold level. The machine tool 102' is connected to the input of each of the critical value indicators 112, 113 and 114 via an amplifier and smoothing circuit or filter 117. The part of the machine tool 102' which is connected to the amplifier 117 is the measurand transmitter thereof, which may comprise, for example, the torque transmitter.

The outputs of the critical value indicators 112, 113 and 114 are connected to an input of the digital control 101' via a switch 106. The measurand transmitter of the machine tool 102' is connected to another input of the digital control 101' via an amplifier 118 and an additional critical value indicator 111, connected in series circuit arrangement therewith, which is a variable response sensitivity to a minimum threshold level $M_{min}$ of the torque. The output signals of the critical value indicators 112, 113 and 114 control the type or mode of operation or process, as well as the blocking or release of the power reversible counters 107 and 109 and a pair of pulse generators 108 and 110.

The reversible counter 107 is for the y direction, the reversible counter 109 is for the x direction. The pulse generator 108 is for the y direction and the pulse generator 110 is for the x direction. The control of the pulse generators 108 and 110 by the digital control 101' is effected via NOR stages or gates 115 and adders or adding components 116, which lock the additiional control pulses into the corresponding pulse generators 108 and 110. The digital control 101' controls the reversible counters 107 and 109 via NOR gates 119. The additional critical value indicator 111 controls the changeover from rapid to working speed of the tool.

In FIG. 9a, the desired contour path is indicated as $P_0$, $p'_1$, $p'_4$ and $P_5$. The feed or movement of the machine tool is from $x_0$ to $x_5$. The digital control 101' (FIG. 7) thus supplies to the machine tool 102' a number of x pulses corresponding to the distance $x_0$ to $x_5$.

If the milling or cutting tool F of FIG. 9a is not at the point $P_0$ at the commencement of the milling process or operation, said milling tool initially moves at rapid speed toward the workpiece W. The torque M applied to the cutting tool F remains less than the minimum torque or threshold level $M_{min}$. At the point $P_0$, the tool F engages the workpiece W. The torque applied by the torque transmitter to the machine tool 102' then exceeds the minimum threshold level $M_{min}$. This causes the additional critical value indicator 111 (FIG. 7) to initiate the work feed. When the torque increases so that it is greater than the lower threshold level $M_{max}-\Delta$ and less than the upper threshold level $M_{max}$, the working process proceeds rapidly. If the torque were to increase to a magnitude greater than the upper threshold level $M_{max}$, the work process would proceed slowly and the cutting depth would be reduced.

Figure 9B:
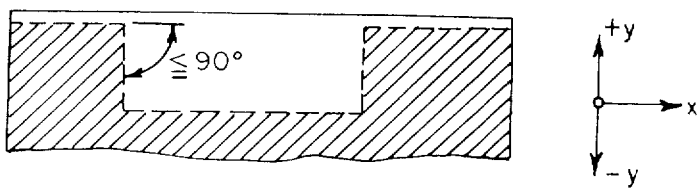

If the cutting tool F is positioned along the contour path $P_0$ to $P'_1$ and the torque applied to said tool is between the lower threshold level and the upper threshold level, said contour path is milled at rapid speed. When the milling tool F abuts the projection at the point $P'_1$, the upper threshold level $M_{max}$ of the torque is exceeded. The work process then continues slowly, rather than rapidly, and a command is simultaneously provided to reduce the cutting depth in the direction $+y$ (FIG. 9b). The pulse generator 108 of FIG. 7 is controlled by the critical value indicator 113 for this purpose. The pulse generator 108 supplies $+y$ control pulses to the machine tool 102' via the corresponding adder 116.

The $+y$ control pulses supplied by the pulse generator 108 to the machine tool 102' are also supplied to the reversible counter 107. Since this corresponds to a substantially vertical contour path, the threshold level $M_{max}+\Delta$ above the upper thresh-old level is exceeded a short time thereafter. This causes the critical value indicator 114 to respond and block the x forward feed. The critical value indicator 114 controls the pulse generator 110 to supply $+x$ pulses to the reversible counter 109 and to the machine tool 102' via the corresponding adder 116. The milling tool F then moves from the point $P'_1$ to the point $P'_2$ FIG. 9a).

The torque applied to the tool F becomes less than the threshold level $M_{max}+\Delta$ when said tool is in the vicinity of the point $P'_2$. As a result, the x control pulses are supplied to the machine tool F. The torque decreases to less than the upper threshold level $M_{max}$ due to the reduction of the cutting depth. The reduction of the cutting depth is halted at the point $P'_2$ in the direction $+y$. The contour path $P'_1$ to $P'_2$ is then recorded or stored in the reversible counter 107. The contour path which the tool 102' or F would have moved in the x direction, if the x forward feed were not blocked, is stored or recorded in the counter 109.

The cutting tool F is moved from the point $P'_2$ to the point $P'_3$ along the contour path $P'_2$ to $P'_3$ in FIG. 9a. At the point $P'_3$, the cutting tool moves freely, so that the torque applied thereto becomes less than the minimum threshold level $M_{max}-\Delta$. A command signal is then supplied to the pulse generator 108 and said pulse generator, in response to said command signal, supplies six control pulses for increasing the cutting depth. The y control pulses are simultaneously supplied to the reversible counter 107 and said counter then counts backward. When the machine tool reaches the point $P'_4$ at the end of the contour path $P'_3$ to $P'_4$, the count condition of the reversible counter 107 is zero. The pulse generator 108 is then halted in operation and the cutting tool 102' (FIG. 7) is moved in $x$ direction, along the contour path $P'_4$ to $P_5$, from the point $P'_4$ to the point $P_5$.

Only the $x$ direction control pulses supplied to the reversible counter 109 during the blocking condition are unaccounted for. To account for these pulses, the repetition of the operation or process cycle should be blocked or delayed until the count condition of the reversible counter 109 reaches zero. At the end of each cycle of operation a command is transferred to the pulse generator 110 (FIG. 7), in the aforedescribed manner, so that said pulse generator supplies control pulses simultaneously to the counter 109 of the machine tool 102', until said counter again reaches its zero count condition. The cycle, as described, is then repeated until the entire contour path $P_0$ $P'_1$ $P'_4$ $P_5$ is transversed by the tool at rapid speed. At such time, the desired contour path, indicated by the broken lines, is actually attained.

The aforedescribed operation may be utilized to provide the contour shown in FIG. 9b.

Each of the component blocks of each of FIGS. 6 and 7 represents a known circuit arrangement and any suitable circuit which functions in the manner indicated may be utilized as such block.

While the invention has been described by means of a specific example and in a specific embodiment, we do not wish to be limited thereto, for obvious modifications will occur to those skilled in the art without departing from the spirit and scope of the invention.

We claim:

1. A method for automatic programmed control of a machine tool for removal of material from a workpiece, including the steps of rapidly feeding the tool until it comes into contact with a workpiece, feeding the tool along the programmed contour with the programmed velocity as long as a magnitude depending upon the material removing rate does not exceed a longitudinal processing threshold level, reducing the feeding velocity of the tool as long as the magnitude depending upon the removing rate exceeds said processing threshold level, reducing the work feeding in a direction perpendicular to that direction when the feed velocity decreases to less than a specific magnitude $V_{min}$, and work feeding the tool repeatedly until the actual contour of the workpiece coincides with a programmed contour, said method comprising the steps of deriving the material removing rate $P_z$ from the product of speed and torque of the tool or workpiece;

controlling the feed velocity $V_z$ in one direction of movement of the tool or workpiece in dependence upon the derived material removing rate; and controlling the feed velocity $V_z$ in the direction perpendicular to the one direction in dependence upon the removing rate as long as that rate exceeds a specific magnitude $P_{z\,max}$.

2. A method as claimed in claim 1, wherein the machine tool is a turning machine and the velocity of the workpiece is varied in dependence upon the feed in said perpendicular direction.

3. A method as claimed in claim 1, wherein a decrease in feed velocity in dependence upon the material removing rate is directly effected and an increase in feed velocity in dependence upon the material removing rate is effected with delay.

4. A method as claimed in claim 1, wherein the feed velocity in said perpendicular directions is controlled in dependence upon the derivative $dP_z/dt$ of the removing rate.

5. Apparatus for automatic programmed control of a machine tool for removal of material from a workpiece, comprising feeding means for rapidly feeding the machine tool until it comes into contact with a workpiece; and work feeding means for work feeding the tool with the programmed velocity as long as a magnitude depending upon the material removing rate does not exceed a longitudinal processing threshold level and for reducing the feeding velocity as long as the magnitude depending upon the forming power exceeds said processing threshold level, and reducing the work feeding in a direction perpendicular to that direction when the feed velocity decreases to less than a specific magnitude $V_{min}$, said work feeding means operating repeatedly until the actual contour of the workpiece coincides with a programmed contour and having inputs connected to said tool or workpiece for supplying signals representing the speed and torque of the tool or workpiece, said work feeding means having a multiplier connected to said inputs for providing a signal $P_z$ corresponding to the material removing rate, and integral regulating means, reference magnitude means, voltage-frequency converting means, critical value indicating means and gate means for producing a first control signal for controlling the feed velocity $V_z$ in one direction of movement of the tool or workpiece in dependence upon the material removing rate and for producing a second control signal for controlling the feed velocity $V_z$ in a direction perpendicular to the one direction in dependence upon the removing rate as long as that rate exceeds a specific magnitude and outputs connected from said gate means to said tool or workpiece for supplying the first and second control signals to said tool or workpiece.

* * * * *